(12) United States Patent
Espinosa

(10) Patent No.: US 10,578,951 B1
(45) Date of Patent: Mar. 3, 2020

(54) APPARATUS THAT ENABLES THE PHOTOGRAPHING OF HIGHLY REFLECTIVE, OBJECTS WITHOUT REFLECTIONS

(71) Applicant: Erik Espinosa, Parkville, MD (US)

(72) Inventor: Erik Espinosa, Parkville, MD (US)

( * ) Notice: Subject to any disclaimer, the term of this patent is extended or adjusted under 35 U.S.C. 154(b) by 0 days.

(21) Appl. No.: 16/357,718

(22) Filed: Mar. 19, 2019

(51) Int. Cl.
*G03B 15/06* (2006.01)
*G03B 15/12* (2006.01)
*G02B 27/14* (2006.01)

(52) U.S. Cl.
CPC .......... *G03B 15/06* (2013.01); *G02B 27/144* (2013.01); *G03B 15/12* (2013.01)

(58) Field of Classification Search
CPC ................................ G03B 15/12; G03B 15/06
USPC ........................................................ 396/4–6
See application file for complete search history.

(56) References Cited

U.S. PATENT DOCUMENTS

| | | | |
|---|---|---|---|
| 4,847,663 A | 7/1989 | Query | |
| 5,024,525 A * | 6/1991 | Yoshida | G03B 15/06 355/67 |
| 5,684,530 A * | 11/1997 | White | G01N 21/8806 348/131 |
| 6,341,878 B1 * | 1/2002 | Chiang | G01N 21/8806 362/19 |
| 6,746,986 B1 * | 6/2004 | Sato | B41M 5/0355 503/227 |
| 6,788,886 B2 | 9/2004 | Saigo | |
| 7,386,227 B1 | 6/2008 | Henderson | |
| 7,680,401 B1 | 3/2010 | Adelstein | |
| 7,760,229 B2 | 7/2010 | White | |
| 7,796,869 B2 | 9/2010 | Bakewell | |
| 8,032,017 B2 * | 10/2011 | Pastore | G03B 15/06 348/131 |
| 8,145,048 B2 | 3/2012 | Messier | |
| 8,285,130 B1 | 10/2012 | Lai | |

(Continued)

FOREIGN PATENT DOCUMENTS

JP 63223732 A * 9/1988

OTHER PUBLICATIONS

Stackexchange discussion, https://photo.stackexchange.com/questions/61106/how-to-shoot-a-reflection-in-a-ball-bearing-without-appearing-in-it, Archive.org dated Sep. 7, 2015 (Year: 2015).*

(Continued)

*Primary Examiner* — Clayton E. LaBalle
*Assistant Examiner* — Leon W Rhodes, Jr.
(74) *Attorney, Agent, or Firm* — Larry J. Guffey, Esq.; Oliver & Grimsley, LLC

(57) ABSTRACT

A variable-volume enclosure that enables the photographing, from outside the enclosure, of highly reflective, objects placed in the enclosure without the reflections of things in the environment surrounding the enclosure being seen in the objects includes: (a) a translucent, planar base, (b) a pliable, two-way mirror that is configured so that, when its opposing edges are brought towards one another, the mirror's central portion bends upward to create a temporary enclosed region of the enclosure, (c) an attachment mechanism for fixedly attaching said one of the mirror's edges to the base's top surface, (d) an adjustable attachment mechanism that temporarily and adjustably attaches the mirror's other edge to the base's top surface, (e) a translucent covering which is adjustably attached to a mirror end.

15 Claims, 7 Drawing Sheets

(56) References Cited

U.S. PATENT DOCUMENTS

| 8,368,769 | B2 | 2/2013 | Yumiki |
| 8,430,516 | B2 | 4/2013 | Hanabusa |
| 8,801,190 | B2 | 8/2014 | Joseph et al. |

OTHER PUBLICATIONS

Folding Portable Lightbox Studio at https://www.etsy.com/listing/585437922/folding-portable-lightbox-studio Website printed Mar. 12, 2019 (Year: 2019).*
Yescom Photo Studio Photography Light Tent at https://www.google.com/shopping/product/16406785518062137263?q=products+to+photograph+reflective+objects&biw=1104&bih=754&prds=paur:ClkAsKraX7_90SeyEmS-AyN5B55wFtx0LrGG7JYUFqCk5GwyVezmWMwZc6O5bmjv6jzXsaCZMsSwiltk7RC-cpGPsF2dc-89KcONfNccT-Cyw_wlsgZtDRi3ghIZAFPVH71XOSUEw0o9P2_ROddxvCB9d-2wCA&sa=X&ved=0ahUKEwjm6qLyxazfAhVHrVkKHZT3BgcQ8wIl1ql Website printed Mar. 12, 2019.
Square Table Top Photo Photography Studio Lighting Light Shooting Tent Box Kit at https://tableclothsfactory.com/products/16-square-table-top-photo-photography-studio-lighting-light-shooting-tent-box-kit?variant=46812810703&gclid=CjwKCAiA9efg6RAYEiwAUT-tKArJJp24mRYISrZu0_4D5zY3Iz6t25himydTaVkqeFbz1w97eKBBRoC47gQAvD_BwE Website printed Mar. 12, 2019.
Studio Essentials Tabletop Photography Kit at https://www.google.com/shopping/product/10680259469185239273?q=products+to+photograph+reflective+objects&biw=1104&bih=754&prds=paur:ClkAsKraX5y_tkHAUj-sxnvoDO2Sg4mxXU4tLqox-ELNTmbjOJhVtg-MwU10twnmm3OMJSz6xtTFyn5BFICDgh-VcQhqwlwajEr-EnIsV3Na8WwXMyrFnvYQ0JpBIZAFPVH73tFRrIKwMElpMxz9n3JnQ2eAWPhQ&sa=X&ved=0ahUKEwjm6qLyxazfAhVHrVkKHZT3BgcQ8wIl8AI Website printed Mar. 12, 2019.
Amzdeal product at https://www.google.com/shopping/product/8251413552318249896?q=products+to+photograph+reflective+objects&biw=1104&bih=754&prds=paur:CIkAsKraX2p6tAsZvluCV2aFU1euzUK6nSYAuiKv0JuUtE5N-A9GAG-vzOCOkFsi4ZLGIB7FNDnMdavnamjiWcjJYk1cX9mLM1vBL72-YBomnpklqGcDr68U5xIZAFPVH70Jg4HKtbMpzK76Q08aZCw-dbnPHA&sa=X&ved=0ahUKEwjm6qLyxazfAhVHrVkKHZT3-BgcQ8wII_gl Website printed Mar. 12, 2019.
Gesswein Small Photo Light box at https://www.gesswein.com/p-12856-gesswein-small-photo-light-box.aspx?gclid=CjwKCAiA9efgBRAYEiwAUT-jtG72-vsBX34tdBEuTdw3PJPBXg3XuuvTTWwL5bEGstFcEPNeMSsz6RoCV3kQAvD_BwE Website printed Mar. 12, 2019.
Smart Light Box Photo Jewelry Coins Product Studio at https://www.bonanza.corn/listings/New-Smart-Light-Box-Photo-Jewelry-Coins-Product-Studio/494130886?goog_pla=1&gpid=68416460221&keyword=&goog_pla=1&pos=1o16&ad_type=pla&gclid=CjwKCAiA9efgBRAYEiwAUT-jtIERzohH30cHFlv8F-FIEVoqq4pmg1gRzXza7P_BsgfAowzk7otkjxRoCDUwQAvD_BwE Website printed Mar. 12, 2019.
OrangeMonkie Foldio3 product at https://www.google.com/shopping/product/16931220320117487416?q=studio+light+box&biw=1104&bih=754&prds=paur:ClkAsKraXyo3Szj7IQf97Gkvw3Tg9gEBRfiG17IEhy2rsXHUrQd4a-ywRsK5aDdVqbEY5x9O3cXoPht-cAYyvIFJx-RFHBzvysMIB48vRXK1V_u0a3b-N9EMdnhI-ZAFPVH72kB_j0g-BAuLl5zgYQRENBcuikyg&sa=X&ved=0ahUKEwi9m_-jxqzfAhWkt1kKHWJkCysQ8wIIqQM Website printed Mar. 12, 2019.

* cited by examiner

APPARATUS THAT ENABLES THE PHOTOGRAPHING OF HIGHLY REFLECTIVE, OBJECTS WITHOUT REFLECTIONS

BACKGROUND OF THE INVENTION

1. Field of the Invention

The present invention relates generally to photography, and more particularly to a method and apparatus that enables the photographing of highly reflective, table top objects without the reflections of things in the surrounding environment being seen in the highly reflective objects.

2. Description of the Related Art

In the past, taking photographs of highly reflective objects, such as pieces of jewelry, with conventional cameras has often required considerable time and effort to yield pictures that are relatively free of reflections being seen in the objects. Much trial and error was often needed to properly position umbrellas or light diffusion screens and the necessary lighting before a relatively, reflection-free photograph could be achieved.

Highly reflective objects can also frequently cause black spots and shadows in pictures of such objects, as these objects reflect into the camera lens the light used and needed for proper exposure. This exposure light reflection does not allow one to see the detail or highlights of, for example, diamond rings and other jewelry in finished photographs.

Many attempts have been made to come up with inventive solutions that will reduce the time and effort required to yield relatively, reflection-free photographs of highly reflective objects. For example, U.S. Pat. No. 4,847,663 discloses a method and apparatus to quickly and efficiently photograph highly reflective, table-top objects by utilizing a copy camera and placing a shadow box around the object and covers over the camera parts and between the lights and the object.

U.S. Pat. No. 7,386,227 discloses a method and apparatus for photographic illumination that utilizes a light-diffusing, light box having an aperture in one of its walls and in which is placed an article or articles to be photographed. The method further comprises a means for producing light beams including fiber optics and multiple LEDs, means for varying the number of beams projected onto the photographic subject.

U.S. Pat. No. 8,145,048 discloses a photo booth including a frame defining support members for a plurality of adjacent walls with flexible panels that are light reflective on one side. The photo booth further includes photographic equipment including at least one light for installing in an aperture defined in one of the panels.

See also U.S. Pat. Nos. 7,796,869, 7,680,401 and 6,788, 886.

Despite this prior art, there still continues to be a need for improved methods and apparatus that will reduce the time and effort required to yield relatively, reflection-free photographs of highly reflective objects.

SUMMARY OF THE INVENTION

Recognizing the need for the development of improved methods and apparatus that will reduce the time and effort required to yield relatively, reflection-free photographs of highly reflective objects, the present invention seeks to provide such improved photographic methods and apparatus.

In accordance with a preferred embodiment of the present invention, a portable, variable-volume apparatus or enclosure that enables the photographing of highly reflective, table top objects placed within the enclosure includes: (a) a rigid, translucent, (b) a pliable, thin, two-way mirror having spaced-apart, opposing, lateral edges and two, opposing ends, wherein the two-way mirror is configured so that it can be contoured so as to create a temporary, enclosed region below the two-way mirror's bottom surface that is of sufficient size to accommodate the highly reflective object that is to be photographed, (c) an attachment means for temporarily attaching one of the mirror's lateral edges to the base's top surface, (d) an adjustable attachment means for temporarily and adjustably attaching the two-way mirror's other lateral edge to the base's top surface, and (e) a pair of translucent, end coverings, each of which is adjustably attached to one of two-way mirror ends and each configured so as to enclose the area adjoining the end and the portion of the base that is proximate the end.

Another preferred embodiment of the present invention further includes a light source that has an intensity level so that, when the light from this source is passed through the translucent base to illuminate the volume inside the temporarily enclosed region above the base, the resulting level of the lighting in this temporary enclosed region is significantly greater than the level of lighting in the surrounding environment so as to make the two-way mirror's bottom surface perform as a partially reflective surface while the highly reflective object to be photographed is visible through the two-way mirror's now, partially transparent top surface.

Yet another preferred embodiment of the present invention further includes a pair of hinge means, each of which attaches to one of the end coverings and the adjoining end of the two-way mirror and configured so as to adjustably attach the end covering so it may be moved between an open and a closed position so as to expose the temporary, enclosed region above the base to the environment surrounding the enclosure.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
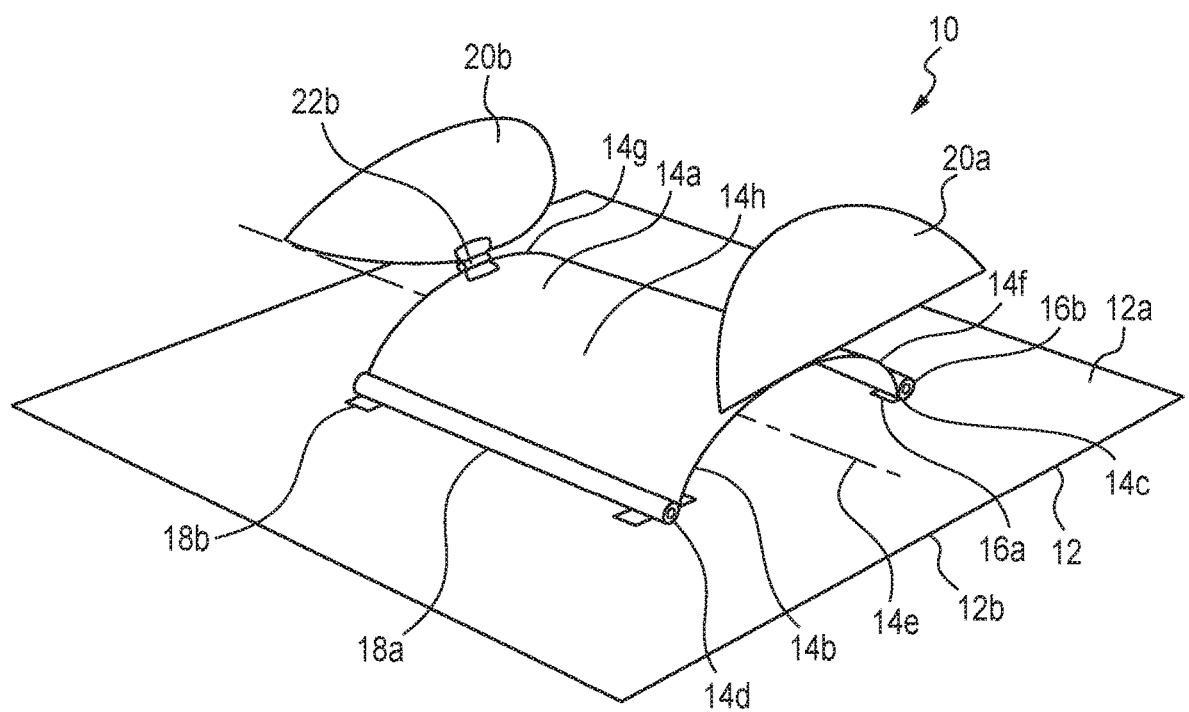
FIG. 1 is a perspective view of a preferred embodiment of the present invention that doesn't include a light source or any illumination being provided from below the base (consequently, the two-way mirror's top surface appears reflective rather than transparent as it does when there is sufficient illumination from below the base) and when the invention's apparatus or enclosure is arranged so that its end coverings are hinged upward.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Referring to FIG. 1, there is illustrated a perspective view of a preferred embodiment of the present invention 10. In this embodiment, the present invention takes the form of a portable or collapsible, variable-volume apparatus or enclosure that enables the photographing of highly reflective, table top objects, which are placed in the enclosure, without the reflections of things (e.g., a camera) or people in the environment surrounding the enclosure from being seen in the objects.

For the proper utilization of this enclosure, there is the requirement that the level of background lighting in the environment surrounding the enclosure be generally set at a specified level which is less than that of the various lighting sources that may be needed to adequately light the object which is to be photographed.

This enclosure has a rigid, thin, translucent, planar base 12 which an inner or top 12a and an outer or bottom 12b surface. To give one a better idea of the nature of this base, it can be noted that the base shown in FIG. 1 has dimensions of 24 inches by 24 inches, and has a thickness of 0.1875 inches and is identified as a "White Acrylic Sheet, Translucent 32%" and is available from the Falken Design Corporation of New York, N.Y.

The enclosure also has a pliable, thin, two-way mirror 14 that has opposing surfaces that are primarily partially transparent or partially reflective depending upon how these surfaces are being lit. We'll refer to the two-way mirror shown in FIG. 1 as having an outer or top 14a and an inner or bottom surface 14b and spaced-apart, opposing lateral edges 14c, 14d that have a lateral centerline 14e between them. This enclosure also has two, spaced-apart, opposing ends 14f, 14g. To give one a better idea of the nature of this two-way mirror, it can be noted that the two-way mirror shown in FIG. 1 has dimensions of 11.9375 inches by 11.9375 inches, and has a thickness of 0.04 inches and is identifiable as a "Two-Way Mirror" and is available from "Supreme Tech" of Pekin, Ill.

The configuration of this pliable, two-way mirror is also such that when its opposing lateral edges are uniformly brought towards one another, a central portion 14h of it bends upward so that the two-way mirror exhibits uniform curvature about its lateral centerline and creates a temporary, enclosed region for the enclosure that lies below the mirror's bottom surface 14b and above its base's top surface 12a.

A fixed attachment means 16 is attached to one of the mirror's lateral edges so as to temporarily and fixedly attach it to the base's top surface 12a. For the embodiment shown in FIG. 1, this attachment means consist of bringing together two pieces 16a, 16b or strips of hook and loop material when one piece of the hook and look material 16a is attached to one of the mirror's lateral edges 14c while the other one 16b is appropriately attached to the base's top surface. Alternatively, this fixed attachment means could be, for example, an elongated clamp that is attached to the base's top surface and then opened to receive within the clamp's opposing edges one of the mirror's lateral edges.

To the two-way mirror's other lateral edge 14d is attached a piece 18a of a two-part, adjustable attachment means 18. This piece 18a can also consist of a strip of hook and loop material. Its other piece 18b is also a strip of hook and loop material that is attached to the base's top surface and oriented approximately perpendicular to mirror's adjoining lateral edge 14d so as to temporarily attach this other lateral edge to the base at a spaced apart, adjustable distance from the mirror's fixedly attached lateral edge 14c. Alternatively, this adjustable attachment means could be, for example, a movable clamp that has an elongated base with two ends between which the movable clamp may be located. This clamp base is attached to the base's top surface and oriented approximately perpendicular to mirror's adjoining lateral edge 14d. The movable clamp is then located to its desired position and its opposing edges are opened to receive one of the mirror's lateral edges.

The purpose of these spared apart lateral edges is to create a temporary, enclosed region between the now bent upward, bottom surface 14b of the two-way mirror and the base's top surface.

Figure 2:
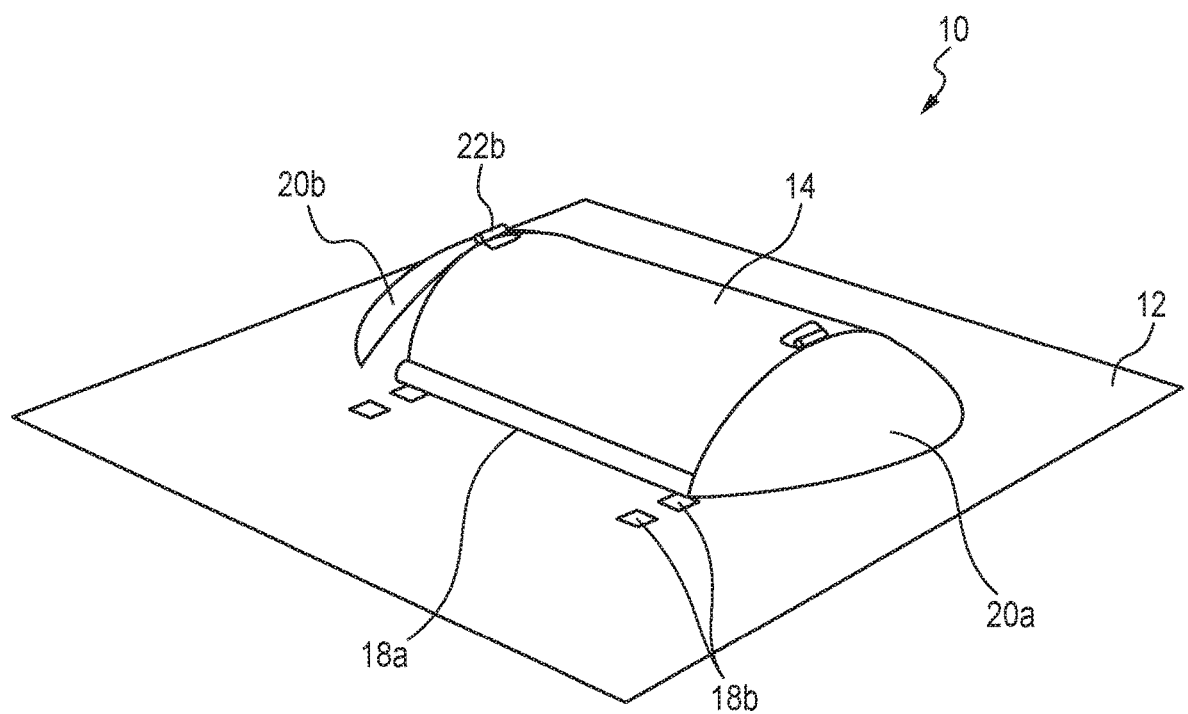
FIG. 2 is a similar perspective view to that shown in FIG. 2 but where the spaced apart distance between the two-way mirror's opposing lateral edges have been brought closer together than they were in FIG. 1 and when the enclosure's translucent end coverings are closed downward upon the underlying base.

The magnitude of this spaced apart distance is adjustably set so that this temporary, enclosed region can assume a desired volume that is sufficient to accommodate the object which is to be photographed within this enclosed region. See FIG. 2. Additionally, it has been found that it sometimes desirable to set the spaced apart distance between these lateral edges and thus the volume of the enclosed region so that the resulting amount of the bend in the mirror's surface can be varied so as to minimize the reflections of the object which be seen reflected back off the mirror's bottom surface and on the surface of the object which is to be photographed.

Figure 3:
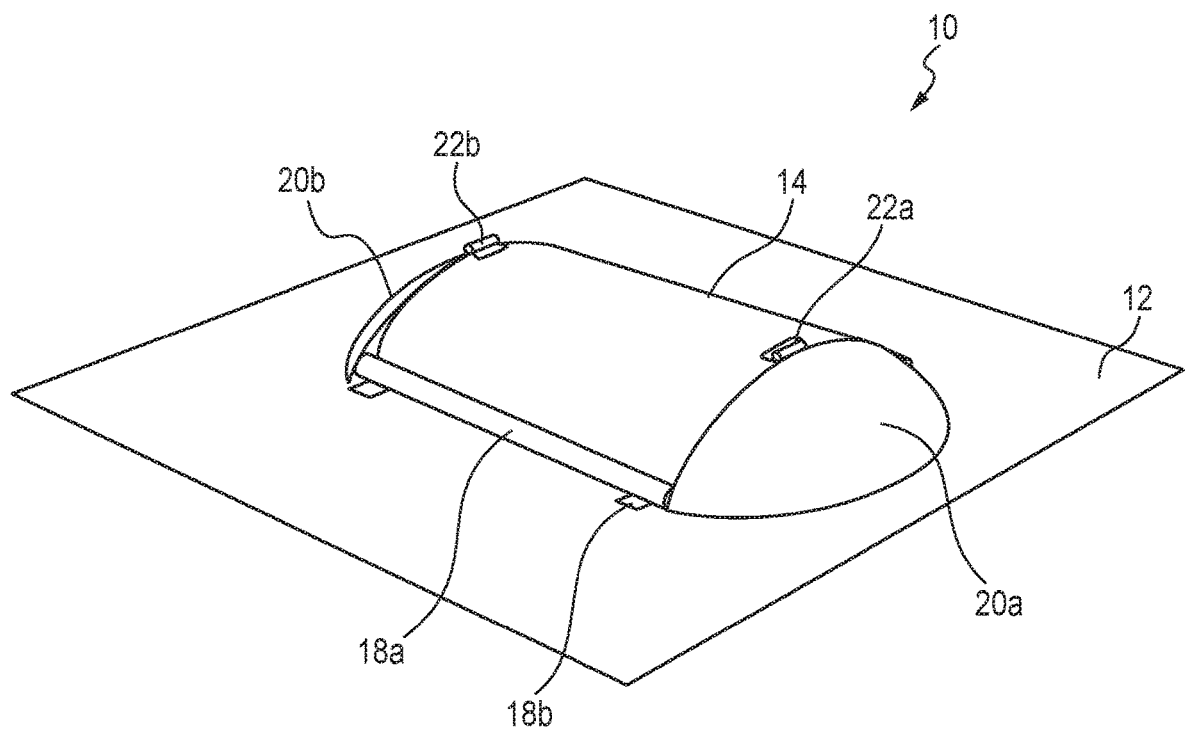
FIG. 3 is a perspective view of a preferred embodiment of the present invention that doesn't include a light source or any illumination being provided from below the base and when the invention's enclosure is arranged so that its end coverings are closed downward upon the underlying base.

The enclosure of the present invention also includes a pair of translucent, end coverings 20a, 20b. One of these is adjustably attached to each of the two-way mirror's ends. The adjustability is provided in order to allow each of these coverings to be moved upward and away from the underlying base so as to allow access to the present invention's temporary, enclosed region. See FIGS. 2 and 3 where these end coverings are shown in their closed positions. To give one a better idea of the nature of these end coverings, it can be noted that each of those shown in FIGS. 1-3 can be described as approximately one-quarter of a quasi-spherical body or a quasi-prolate spheroid that has a major axis whose length is equivalent to the resulting, adjustable, spaced apart distance between the mirror's lateral edges. Such bodies can have thicknesses in the range of 0.1875-0.25 inches and are available from "HD Supply" of Atlanta, Ga.

Each of these end coverings is attached to the mirror's adjoining end by one of a pair of hinges 22a, 22b.

Although FIG. 1 depicts the elements above its base as being a pliable, two-way mirror and its translucent, end coverings, the present enclosure is not limited to such a configuration. The present invention could have any desired number of adjacent walls, a ceiling and a collapsible, supporting frame.

This frame could define a rectangular perimeter, or any other appropriate shape, as for example a square, a hexagon, an octagon, an ellipse, a circle, etc. The frame's support members and connectors may be adapted to define vertical walls, or any other appropriate shape of walls. Because of this flexibility, the enclosure can have a regular shape or an irregular shape. Any three-dimensional shape can further be achieved.

Furthermore, depending upon the size and shape of the highly reflective object that is to be photographed and the adequacy of the lighting from below the base, it may be that the enclosure of the present would not need adjacent walls and could consist of only a ceiling-like, two-way mirror, member that is positioned above the present invention's base and sized and configured so as to hide from the object the camera that is being used for the photography, along with any other items in the surrounding environment whose reflections would be seen in the object.

The present invention can also include the option of a suitable light source 24 for those instances in which the photographer who is going to use to the present invention does not have such a light source. It must have an intensity level so that, when the light from this light source is passed through the present invention's base to illuminate the object in the temporary enclosed region, the resulting level of the lighting in this temporary enclosed region is significantly greater than the level of lighting in the surrounding environment so as to make the two-way mirror's bottom surface perform as a partially reflective surface while the mirror's top surface is partially transparent so that the object in the temporary, enclosed region is visible and can be adequately photographed with the reflections of things (e.g., a camera) or people in the environment surrounding the enclosure from being seen in the highly reflective object.

Figure 4:
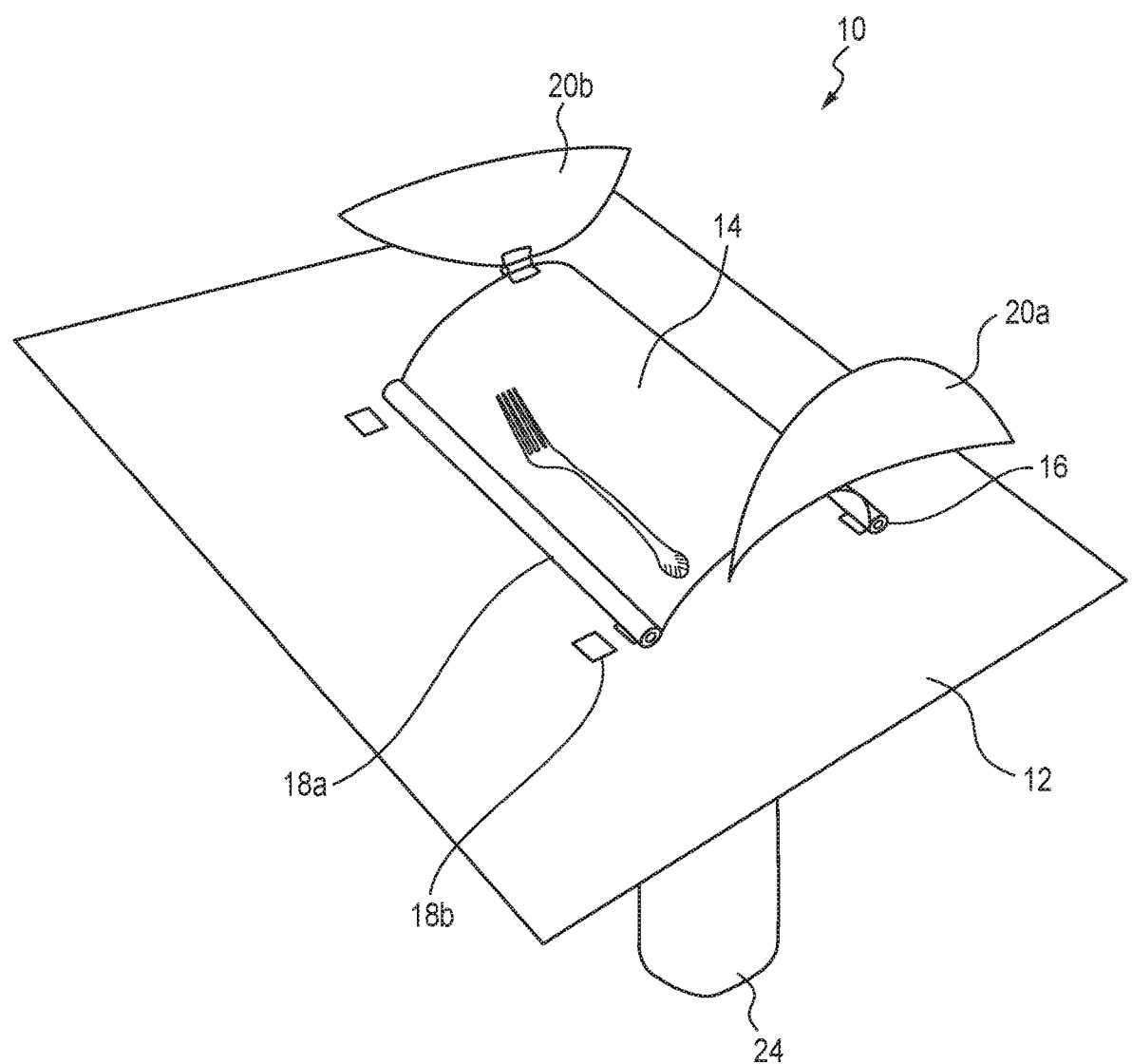
FIG. 4 is a perspective view of a preferred embodiment of the present invention with a silver fork placed in the enclosure and with a light source being used to illuminate the enclosure from below its base and when the invention's enclosure is arranged so that its end coverings are hinged upward and shadows are being seen on the outer regions of the base due to its underlying support members.

To illustrate the use of the present invention, FIG. 4 shows a perspective view of a preferred embodiment of the present invention with a silver fork placed in the enclosure and with a light source 24 being used to illuminate the enclosure from below its base and when the invention's enclosure is arranged so that its end coverings are hinged upward and shadows are being seen on the outer regions of the base due to its underlying support members.

Figure 5:
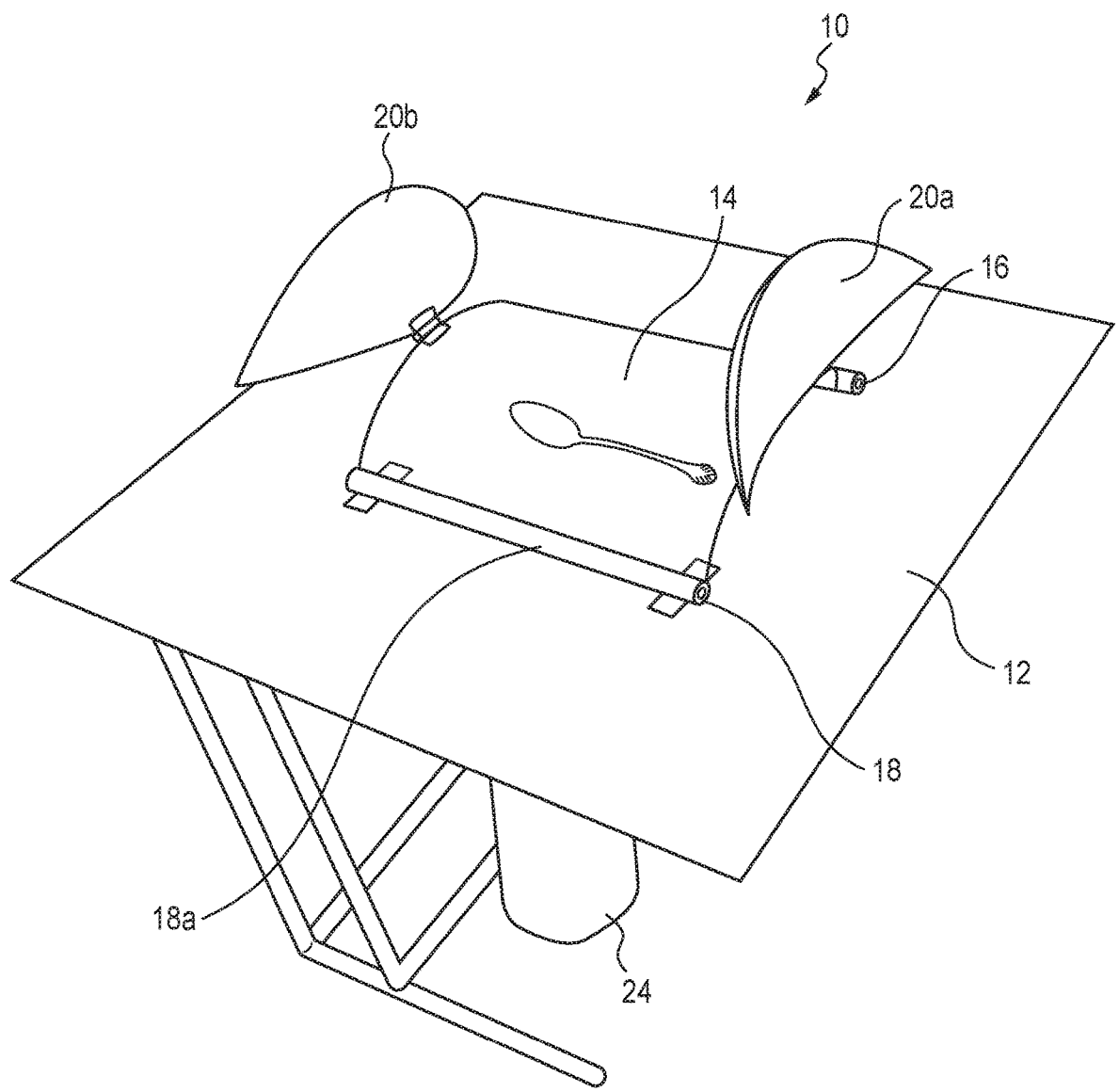
FIG. 5 is a perspective view similar to that shown in FIG. 4 but where the object placed in the enclosure is a silver spoon.

An additional illustration of the use of the present invention is shown in FIG. 5 which is a perspective view similar to that shown in FIG. 4 but where the object placed in the enclosure is a silver spoon.

Figure 6:
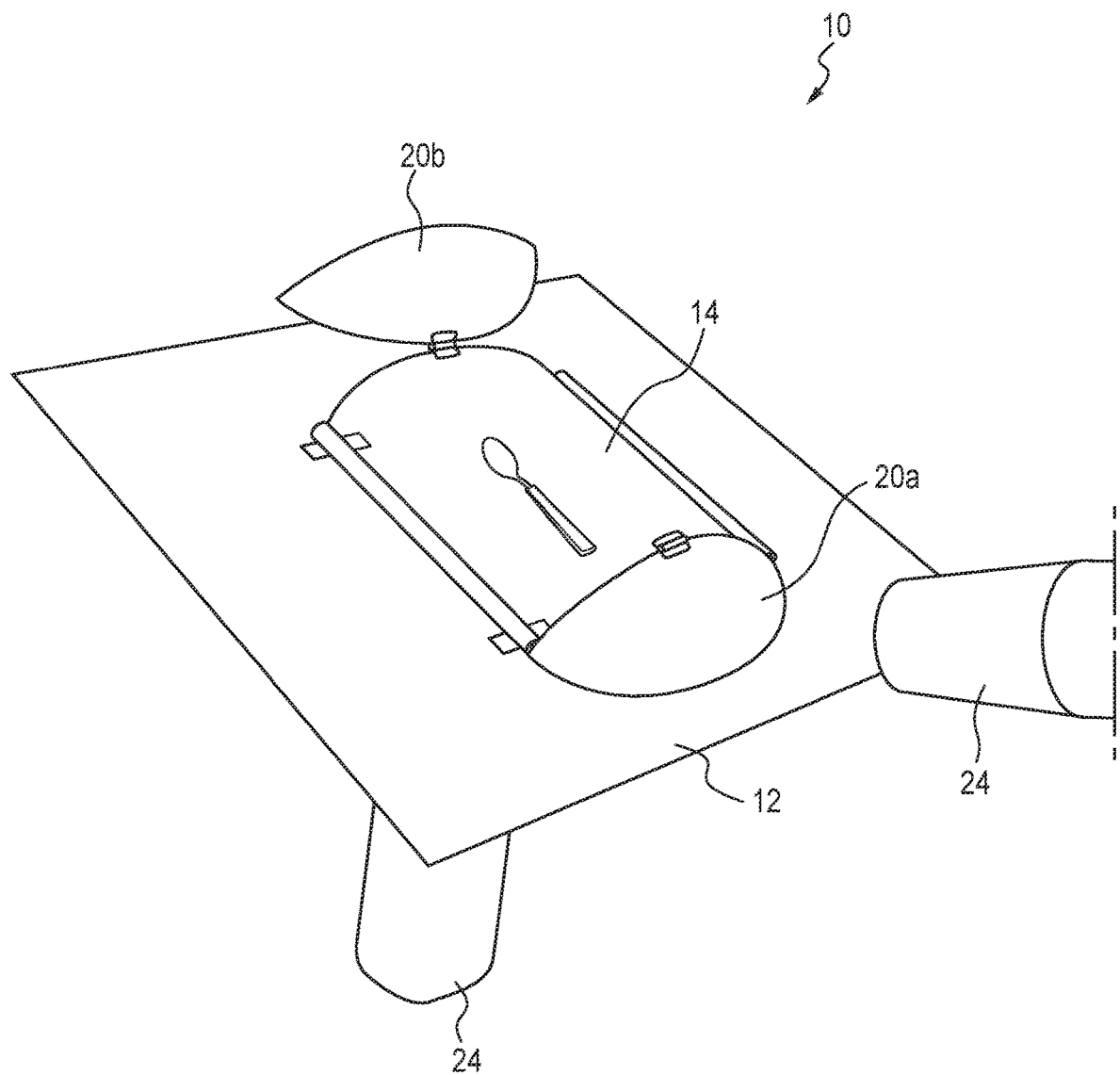
FIG. 6 is a perspective view similar to that shown in FIG. 5 but where the translucent end covering on the right-hand side has been closed and an additional light source is being used to illuminate the object by passing light through this closed end covering.

Yet another illustration of the use of the present invention is shown in FIG. 6 which is a perspective view similar to that shown in FIG. 5 but where the translucent end covering on the right-hand side of this figure has been closed and an additional light source 24 is being used to illuminate the object by passing light through this closed end covering.

Figure 7:
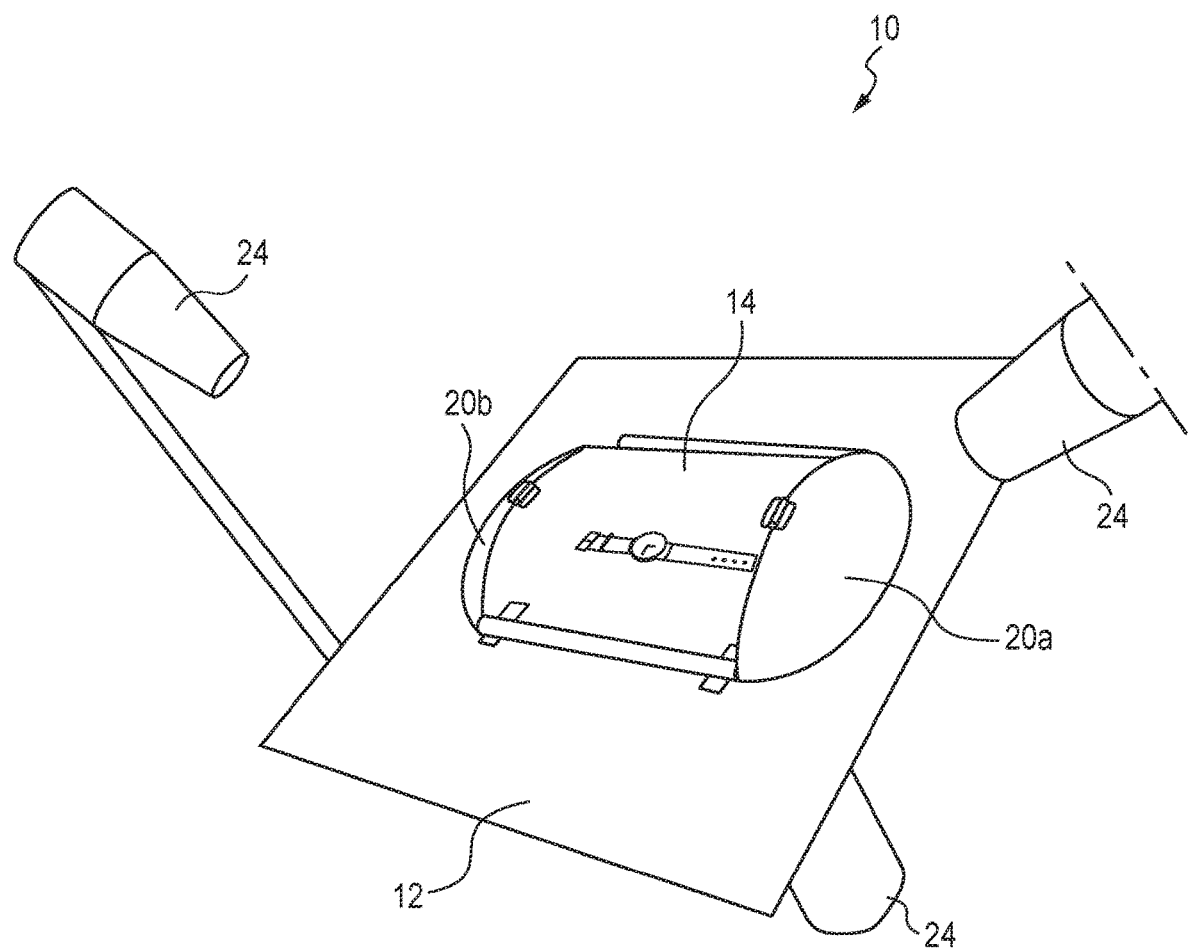
FIG. 7 is a perspective view similar to that shown in FIG. 6 but where both of the translucent end coverings are closed and two additional light sources are being used to illuminate the object, with one of each of these shining light through the closed end covering to which it is adjacent, and the object in the enclosure being a wrist watch with a cloth band whose details are desired to be clearly shown in the photograph.

A final illustration of the use of the present invention is shown in FIG. 7 which is a perspective view similar to that shown in FIG. 6 but where both of the translucent end coverings are closed and two additional light sources are being used to illuminate the object. One of each of these light sources is shining light through the closed end covering to which it is adjacent. The object in the enclosure is a wrist watch with a cloth band whose details are desired to be clearly shown in the photograph and, to achieve this, the additional lighting sources are needed.

When using the present invention, light sources that have been found to be useful for lighting from the beneath the base when, for example, a silver fork placed in the enclosure include strobe lights, continuous lights (tungsten or LED), and speed flashes.

For example, the setups for FIGS. 4-5 used only a single strobe light with an 11 inch modifier attached on its front to control the radial spread of light. For FIGS. 5-7 other strobe light/s, each with a snoot modifier to minimize the spread of light, were also used from above the base and at the enclosure's translucent ends.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. An apparatus that enables a camera to photograph a highly reflective object, placed in said apparatus, without the reflections of things in the environment surrounding said apparatus being seen in said highly reflective object, and wherein the level of lighting in said surrounding environment does not exceed a specified ambient level, said apparatus comprising:
   a translucent base having an inner surface and an outer surface,
   a two-way mirror having an inner surface, and an outer surface, and a central portion, and at least one edge,
   wherein said two-way mirror is configured so that, when said inner surface and said at least one edge of said two-way mirror is placed in close proximity to said inner surface of said base, a temporary enclosed region is created proximate said central portion of said two-way mirror and in which said object is placed and then photographed from outside the outer surface of said two-way mirror.

2. The apparatus as recited in claim 1, further comprising:
   a light source that has an intensity level so that, when light from said source is passed from outside the outer surface of said base to illuminate said temporary enclosed region, the resulting level of the lighting in said temporary enclosed region is greater than said specified ambient level and causes said inner surface of said two-way mirror to perform as a partially reflective surface and said outer surface of said two-way mirror to perform as a partially transparent surface.

3. The apparatus as recited in claim 1, wherein:
   said two-way mirror also having spaced-apart, opposing, lateral edges, and two, spaced-apart, opposing ends,
   said two-way mirror is additionally thin so as to be pliable and further configured so that, when said opposing lateral edges are brought towards one another, said central portion of said two-mirror bends upward so as to creates a temporary, enclosed region that lies below said inner surface of said two-way mirror and above the inner surface of said base.

4. The apparatus as recited in claim 2, wherein:
said two-way mirror also having spaced-apart, opposing, lateral edges, and two, spaced-apart, opposing ends,
said two-way mirror is additionally thin so as to be pliable and further configured so that, when said opposing lateral edges are brought towards one another, said central portion of said two-way mirror bends upward so as to creates a temporary, enclosed region that lies below said inner surface of said two-way mirror and above the inner surface of said base.

5. The apparatus as recited in claim 3, further comprising:
a fixed attachment means that is attached to one of said lateral edges so as to temporarily, fixedly attach said one of said lateral edges to said inner surface of said base, and
an adjustable attachment means that is attached to the other of said lateral edges so as to temporarily, adjustably attach said other lateral edge to said inner surface of said base at an adjustable, spaced apart distance from said fixedly attached lateral edge.

6. The apparatus as recited in claim 4, further comprising:
a fixed attachment means that is attached to one of said lateral edges so as to temporarily, fixedly attach said one of said lateral edges to said inner surface of said base, and
an adjustable attachment means that is attached to the other of said lateral edges so as to temporarily, adjustably attach said other lateral edge to said inner surface of said base at an adjustable, spaced apart distance from said fixedly attached lateral edge.

7. The apparatus as recited in claim 5, further comprising:
a pair of translucent coverings, each of which is adjustably attached to one of said two-way mirror ends when said central portion of said two-way mirror is bent upward, and with each of said coverings configured so as to adjustably, enclose the area proximate said end to which said translucent covering is attached and the adjoining portion of the inner surface of said base.

8. The apparatus as recited in claim 6, further comprising:
a pair of translucent coverings, each of which is adjustably attached to one of said two-way mirror ends when said central portion of said two-way mirror is bent upward, and with each of said coverings configured so as to adjustably, enclose the area proximate said end to which said translucent covering is attached and the adjoining portion of the inner surface of said base.

9. The apparatus as recited in claim 7, further comprising:
a pair of hinges, each of which attaches to one of said translucent coverings and one of the ends of said two-way mirror,
wherein each of said hinges is configured so as to enable the translucent covering to which said hinge is attached to move between a closed and an open position so as to expose said temporary, enclosed region to the surrounding environment.

10. The apparatus as recited in claim 8, further comprising:
a pair of hinges, each of which attaches to one of said translucent coverings and one of the ends of said two-way mirror,
wherein each of said hinges is configured so as to enable the translucent covering to which said hinge is attached to move between a closed and an open position so as to expose said temporary, enclosed region to the surrounding environment.

11. A method that enables a camera to photograph a highly reflective object, when said object is placed in an apparatus, without the reflections of things in the environment surrounding said apparatus being seen in said highly reflective object, said method comprising the steps of:
providing a translucent base having an inner surface and an outer surface,
providing a two-way mirror having an inner surface, and an outer surface, and a central portion, and at least one edge,
wherein said two-way mirror is configured so that, when said inner surface and said at least one edge of said two-way mirror is placed in close proximity to said inner surface of said base a temporary enclosed region is created proximate said central portion of said two-way mirror,
placing said object in said temporary enclosed region,
ensuring that the level of lighting in said surrounding environment does not exceed a specified ambient level,
placing a light source outside the outer surface of said base and directing the light from said light source through said base so as to illuminate said temporary enclosed region,
selecting the output of said light source so that the resulting level of the lighting in said temporary enclosed region is greater than said specified ambient level so as to cause said inner surface of said two-way mirror to perform as a partially reflective surface and said outer surface of said two-way mirror to perform as a partially transparent surface, and
photographing said object from outside the outer surface of said two-way mirror.

12. The method as recited in claim 11, further comprising the step of:
wherein said two-way mirror also having spaced-apart, opposing, lateral edges, and two, spaced-apart, opposing ends,
wherein said two-way mirror is additionally thin and pliable, and
bringing said opposing lateral edges towards one another, so that said central portion of said two-way mirror bends outwardly so as to creates a temporary, enclosed region that lies inside said inner surface of said two-way mirror and inside the inner surface of said base.

13. The method as recited in claim 12, further comprising the steps of:
providing a fixed attachment means that is attached to one of said lateral edges so as to temporarily, fixedly attach said one of said lateral edges to said inner surface of said base, and
providing an adjustable attachment means that is attached to the other of said lateral edges so as to temporarily, adjustably attach said other lateral edge to said inner surface of said base at an adjustable, spaced apart distance from said fixedly attached lateral edge.

14. The method as recited in claim 13, further comprising the steps of:
providing a pair of translucent coverings, each of which is adjustably attached to one of said two-way mirror ends when said central portion of said two-way mirror is bent upward, and with each of said coverings configured so as to adjustably, enclose the area proximate said end to which said translucent covering is attached and the adjoining portion of the inner surface of said base.

15. The method as recited in claim 14, further comprising the step of:
 providing a pair of hinges, each of which attaches to both one of said translucent coverings and one of the ends of said two-way mirror,
 wherein each of said hinges is configured so as to enable the translucent covering to which said hinge is attached to move between a closed and an open position so as to expose said temporary, enclosed region to the surrounding environment.

\* \* \* \* \*